Nov. 19, 1935.  E. A. STORMAN  2,021,673
MOTION SIGN OR THE LIKE
Filed Feb. 7, 1934  3 Sheets-Sheet 1
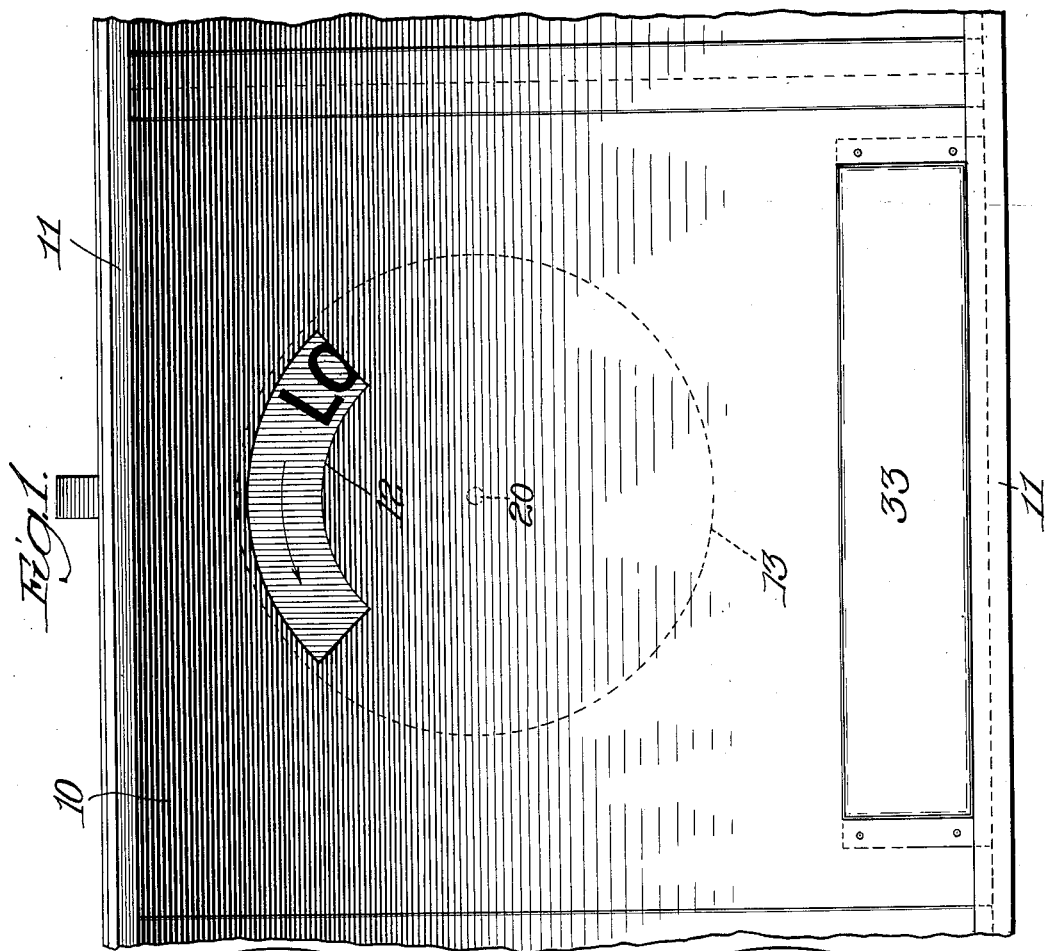
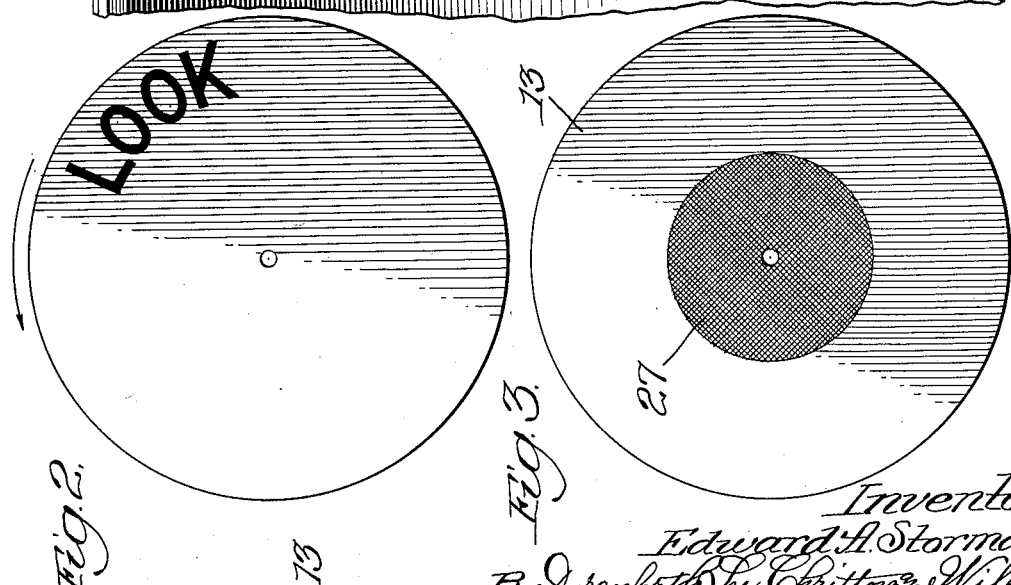
Inventor:
Edward A. Storman Nov. 19, 1935.  E. A. STORMAN  2,021,673
MOTION SIGN OR THE LIKE
Filed Feb. 7, 1934  3 Sheets-Sheet 2
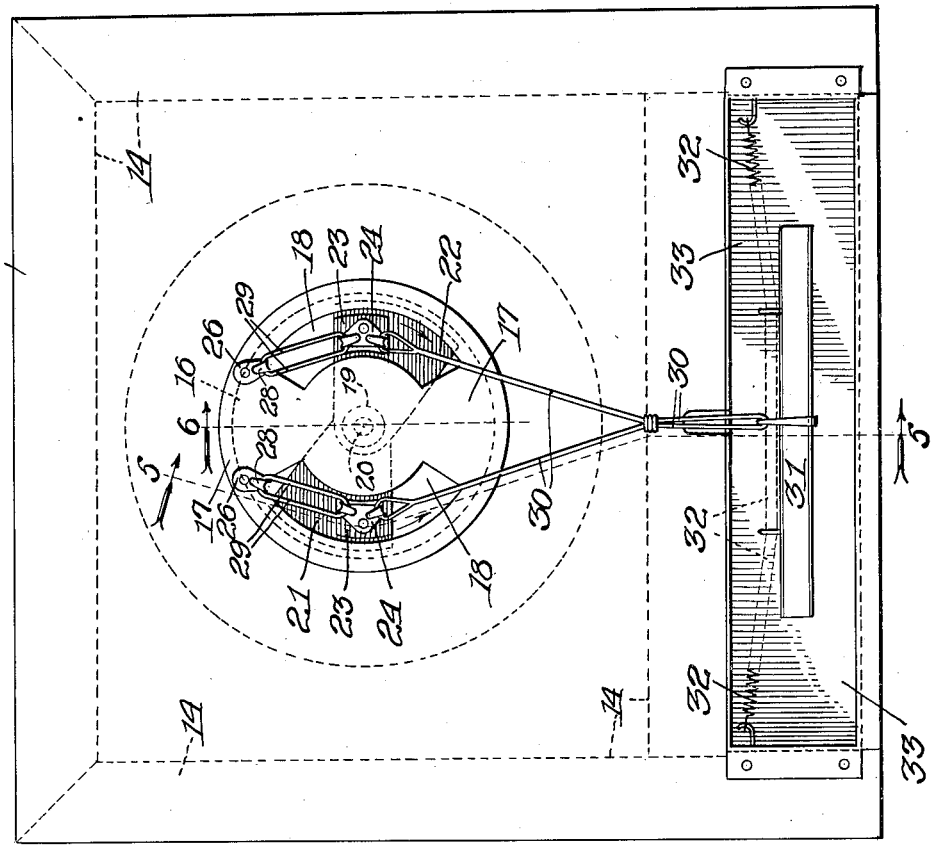
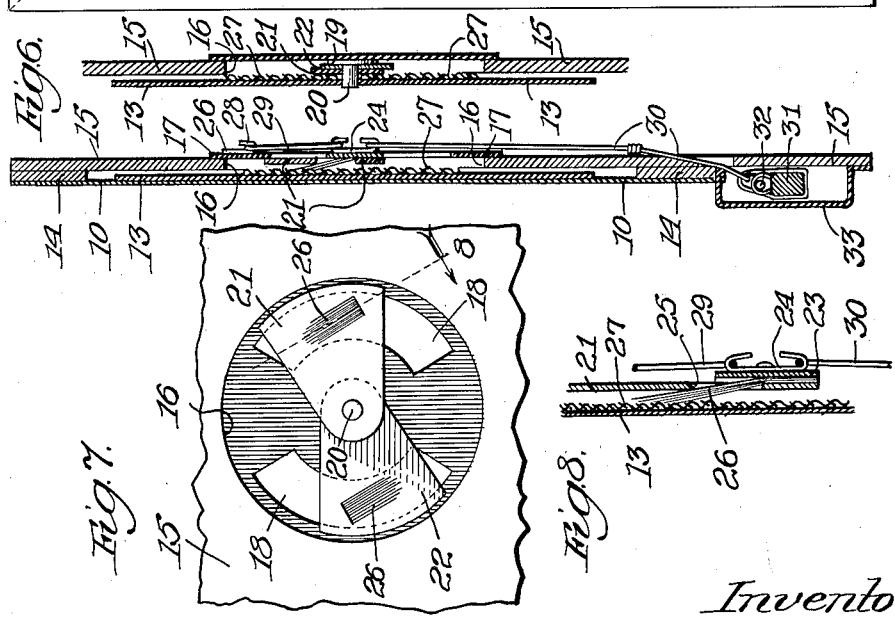
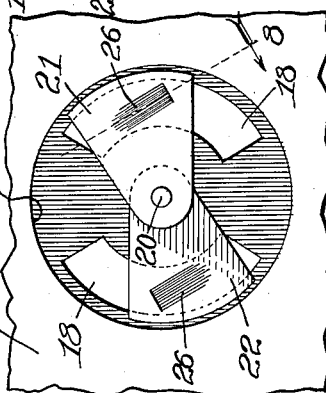
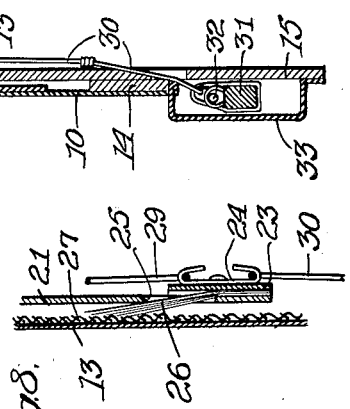
Inventor:
Edward A. Storman,
By Dyrenforth, Lee, Chritton & Wiles,
Att'ys Nov. 19, 1935.   E. A. STORMAN   2,021,673
MOTION SIGN OR THE LIKE
Filed Feb. 7, 1934   3 Sheets-Sheet 3
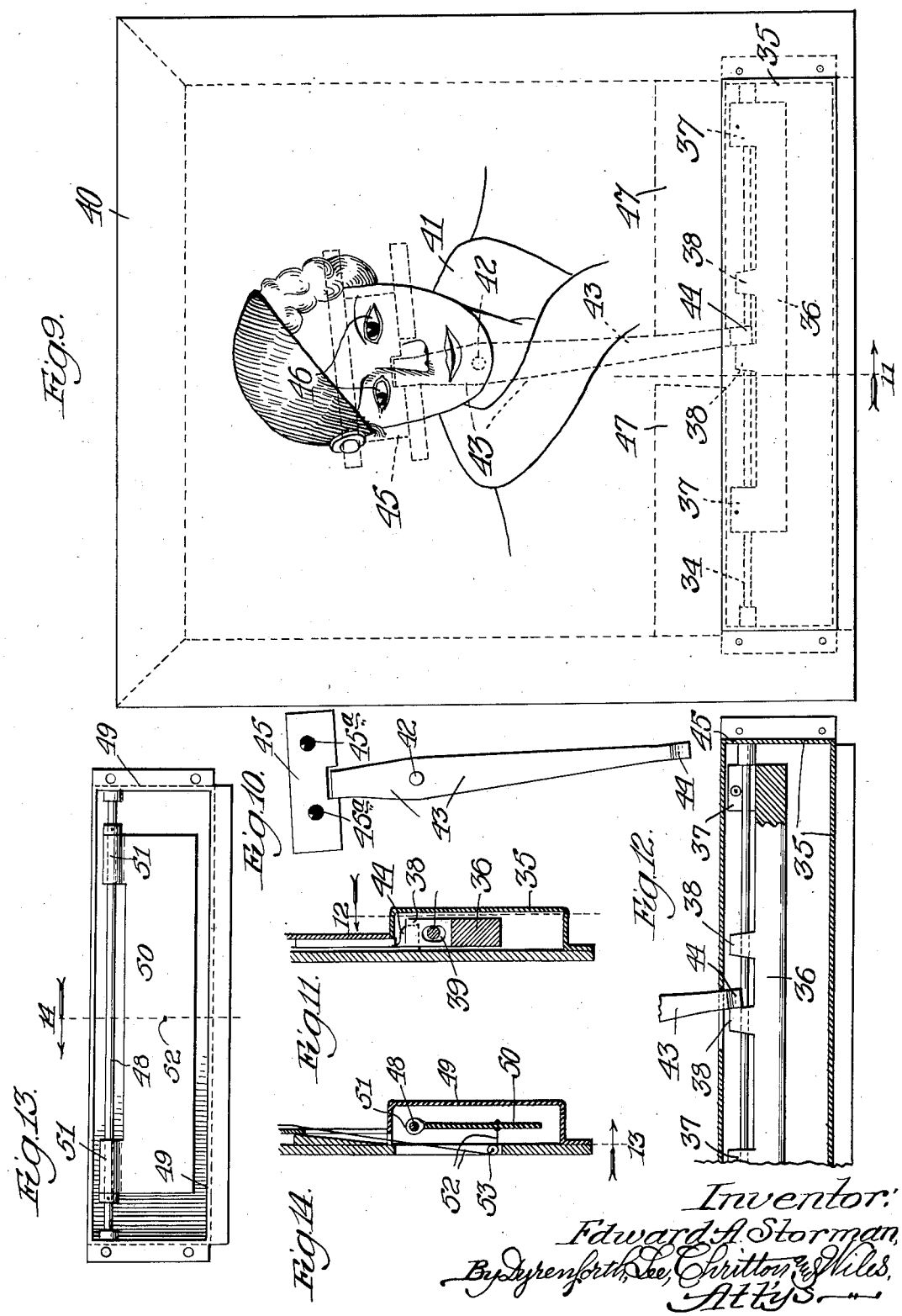

Patented Nov. 19, 1935

2,021,673

UNITED STATES PATENT OFFICE 2,021,673

MOTION SIGN OR THE LIKE

Edward A. Storman, Chicago, Ill.

Application February 7, 1934, Serial No. 710,186

12 Claims. (Cl. 40—51)

This invention relates to a motion sign or the like and is particularly adapted for use with vehicles.

The primary object of the invention is to provide mechanism whereby the motion of a moving vehicle is utilized to produce motion in sign or other indicating means. Other specific objects and advantages will appear as the specification proceeds.

The invention is illustrated, in its preferred embodiments, by the accompanying drawings, in which—

Figure 1 is a broken front view in elevation of apparatus embodying my invention; Fig. 2, a front face view of the rotating disk employed; Fig. 3, a rear face view of the rotating disk; Fig. 4, a rear view in elevation of the apparatus shown in Fig. 1; Fig. 5, a sectional view, the section being taken as indicated at line 5 of Fig. 4; Fig. 6, a broken sectional view, the section being taken as indicated at line 6 of Fig. 4; Fig. 7, a detail view of the means employed for rotating the disk; Fig. 8, an enlarged detail sectional view, the section being taken as indicated at line 8 of Fig. 7; Fig. 9, a front view in elevation of a modified form of the invention; Fig. 10, a plan view of the swinging element shown in dotted lines in Fig. 9; Fig. 11, a detail sectional view, the section being taken as indicated at line 11 of Fig. 9; Fig. 12, a broken detail view of apparatus shown in dotted lines in Fig. 9; Fig. 13, a rear view in elevation of a swinging element constituting a modified form of my invention, the view being taken as indicated at line 13 of Fig. 14; and Fig. 14, a transverse sectional detail view, the section being taken as indicated at line 14 of Fig. 13.

In the modification illustrated in Figs. 1 to 8, inclusive, a board 10 is shown fixed within the guides 11 at the upper curved portion of the side wall of a street car, railway car, bus, etc. On the display board 10 may be imprinted any desired illustration, advertisement, etc. In order to provide means for attracting attention to the sign, I provide a slot 12 in the board 10 through which words, figures, scenes or other matter may be rendered visible. In the particular apparatus illustrated, I employ a disk 13 on which, near the outer periphery of the disk, appears the word "Look". Upon rotation of the disk, the word "Look" is repeatedly brought into registry with slotway 12.

The mechanism for supporting the disk 13 and for utilizing the motion of the vehicle to rotate the disk will now be described. Secured at the rear of cardboard 10 and spaced therefrom by spacers 14 is another board 15. The spacer members 14 provide on their inner sides a chamber in which the disk 13 may rotate. The board 15 is provided centrally with a circular aperture 16 secured to the rear wall of board 15, and extending beyond the edges of opening 16 is a plate 17 which may also be formed of cardboard. Within the plate 17 are formed arcuate slots 18. Secured to the plate 17 is a thin disk 19 to which is secured a pivot shaft 20. As shown more clearly in Figs. 5 and 6, disk 13 is mounted on the forward end of stud 20, while to the rear thereof are pivotally secured swing arms 21 and 22. Each of the arms 21 and 22 is provided near its peripheral portion with a tab 23 to which is secured a hook plate 24. Each arm is provided with an aperture 25 through which extends a brush 26, the inner end of the brush being clamped between the tab 23 and the particular arm. The shape of the bristle brush 26, when secured in this position, is illustrated more clearly in Fig. 8. It will be noted that the outer end of the brush engages a fabric disk 27 which is secured to the rear side of disk 13, as shown more clearly in Figs. 3 and 8. It will be observed that when the swinging arm moves in one direction, the bristles will engage the fabric 27 and tend to rotate disk 13 while when the brush is moved in the other direction, the bristles will tend to glide or ratchet underneath the fabric 27.

The brushes 26 are turned in opposite directions, as illustrated more clearly in Fig. 7, so that the downward movement of arm 21 will tend to rotate the disk, while the upward movement of arm 22 will tend to rotate the disk.

Any suitable means may be employed for moving the swinging arms 21 and 22. In the illustration given, hooks 28 are secured to the upper part of plate 17 and an elastic member 29 is employed to connect hook 28 with one of the hooks carried by plates 24. To the other hooks carried by plates 24 is secured a flexible connecting member 30.

The flexible member 30 may be actuated by a vibrating bar, a swinging member, a slide member or by any other suitable device which will be set in motion by the movement of the vehicle. In the illustration given in Figs. 1 to 8 inclusive, I have shown the member 30 connected to a vibrating bar or weight 31, which is supported by a spring 32 within casing 33.

In the operation of the apparatus, movement of the vehicle along the track, road, etc. and particularly in the stopping and starting thereof, causes a vibration or vertical movement of element 31 and causes the swinging arms 21 and 22 to move downwardly and upwardly. The arm 22 as it moves upwardly brings the end of its brush into engagement with the fabric 27 and rotates disk 13 in a clockwise direction. As the arm 22 moves downwardly, its brush glides under the fabric disk 27 and does not effect movement thereof. Arm 22 as it moves upwardly causes its brush 26 to ratchet underneath cloth 27, but as it moves downwardly, brings the free end of its brush into engagement with the cloth disk 27 and continues the rotation of disk 13 in a clockwise direction.

The continued rotation of the disk 13 brings the word "Look" intermittently into alignment with slot 12 of the board 10. Other words, scenes, figures, etc. may be employed which are in harmony with the advertisement or illustration carried by the main body of the board 10. By changing the direction of brushes 26 on the arm 21, the disk may, of course, be rotated in the opposite direction.

In the modification illustrated in Figs. 9 to 12, a rod 34 is secured within a casing 35 and a weighted bar 36 is slidably carried by rod 34. The bar 36 is provided at its ends with upwardly extending lugs 37 perforated to receive rod 34. Near its center, the bar 36 is provided with a pair of spaced upwardly extending lugs 38 provided with openings 39 through which rod 34 extends, as shown more clearly in Fig. 11. Above the casing 35 extends a display board 40 having thereon, for the purpose of illustration, the picture 41 of a girl. Pivotally secured to the board 40 at 42 is a bar member 43 having at its bottom a forwardly turned lug 44 extending between lugs 38 of bar 36. The member 41 interlockingly engages at its upper end a slidably mounted plate 45 bearing spaced illustrations 45ª drawn to represent pupils. The bar is so supported as to bring the pupils 45 in registry with eye-openings 46 in the picture 41. Stops 47 are provided to limit the swing of the bar 43.

Changes in speed of the vehicle cause the momentum bar 36 to swing forwardly and rearwardly, thereby bringing the lugs 38 into contact with bar 43, and the swinging of the upper end of the bar 43 causes the pupils 45 to be moved from one side to the other of the eye-openings 46. It will be understood that the momentum bar 36 may be utilized to actuate any form of moving sign.

In the illustration given in Fig. 13, a rod 48 is fixed within casing 49 and a swinging or oscillating member 50 is provided with cylindrical ears 51 receiving rod 48. The swinging of the member 30 may be utilized by any mechanical expedient for actuating a moving sign. In the illustration given, a flexible tie element 52 is secured to the member 50 and passes around pulley 53 and upwardly. The flexible element 52 may be substituted, if desired, for the cord 30 shown in Fig. 4, so as to actuate mechanism of the type shown in Fig. 4 or any other form of motion sign mechanism.

While I have illustrated certain specific display mechanism and certain means for utilizing motion of a vehicle to actuate the mechanism, it will be understood that such mechanism and means are given by way of illustration and that great variations may be made readily by one skilled in the art and without departing from the spirit of my invention. The foregoing detailed description has been given for clearness of understanding only, and no unnecessary limitations should be understood therefrom, but the appended claims should be construed as broadly as permissible, in view of the prior art.

I claim:

1. An exhibition device comprising a frame adapted to be supported in a vehicle, a member rotatably mounted upon said frame, a pair of swinging arms carried by said frame, brushes secured to said swinging arms and having their free ends engaging said rotatable member, said brushes being turned in opposite directions, an actuating element movably supported in said frame and adapted to move in response to motion of the vehicle, and means connecting said movable element and said swinging arms.

2. An exhibition device comprising a frame, a rotatable disk supported thereon, said disk being provided at its rear side with a fabric disk, swinging arms secured to said frame and equipped with brushes having their free ends turned in opposite directions and engaging said fabric disk, resilient means for supporting the swing arms in horizontal position, a weight member supported by a resilient member in said frame, and tie means connecting said weight and said swing arms.

3. In apparatus of the character set forth, a frame adapted to be supported in a vehicle, an illustration of the face of a person supported by said frame, said illustration having eye-openings, a pivoted bar behind said illustration and bearing pupil illustrations registering with said eye-openings, stop means limiting the swing of said bar to hold said pupils in constant registration with said eye-openings, a movable element supported by said vehicle and responsive to the motion thereof, and means connecting said bar and said element whereby motion of said element causes a swinging movement of said bar and thereby a movement of said pupil illustrations.

4. In apparatus of the character set forth, a cardboard sign adapted to be supported in the upper side corner of a vehicle, a movable sign element mounted on said cardboard sign, a motor-housing remote from said movable sign element and mounted on the lower side portion of said cardboard sign, a motion-responsive motor mounted for movement in said housing, and connecting means between said motor and said movable sign whereby movement of the motor produces movement of said movable sign element.

5. In apparatus of the character set forth, a flexible signboard adapted to be supported in a vehicle, a movable sign element mounted on said signboard, a motor housing mounted on a side of said signboard remote from said movable sign element, a motion-responsive motor mounted for movement in said housing, and means actuated by said motor in response to vehicle-motion for actuating said movable sign element.

6. In apparatus of the character set forth, a signboard adapted to be supported in a vehicle, a movable sign element mounted on said signboard, a motor housing supported at a point remote from said movable sign element, a motion-responsive motor mounted for movement in said housing, and connecting means between said motor and said movable sign element.

7. An automatic sign unit comprising a signboard adapted to be supported in a vehicle, a movable sign element mounted on said signboard, a motor-box secured to said signboard, a motion-responsive motor mounted in said box for movement in response to movement of the vehicle, said box being provided with at least one opening, and connecting means extending through said opening and connecting the motor to said movable sign element.

8. In apparatus of the character set forth, a signboard adapted to be supported in a vehicle, a movable sign element mounted on said signboard, a motor-housing secured to said signboard, said housing being provided with at least one opening, a vehicle motion-responsive motor mounted for movement in said housing, and flexible connections extending through said opening and connecting said movable sign element to said motor.

9. In apparatus of the character set forth, a signboard adapted to be supported in a vehicle, a movable sign element mounted on said signboard, and a motion-responsive member supported by said signboard at a point remote from said movable sign element, said member being mounted for movement in response to motion of the vehicle, and connecting means between said motion-responsive member and said movable sign.

10. In apparatus of the character set forth, a signboard adapted to be supported in a vehicle, a movable sign element mounted on said signboard, a motion-responsive member supported for movement at a point remote from said sign element, said member moving in response to movement of said vehicle, and connections between said motion-responsive member and said movable sign element.

11. An exhibition device comprising a frame, a rotatable member supported thereon, movable arms secured to said frame, brushes secured to said arms and having their free ends extending in opposite directions and engaging said rotatable member, and means for moving said arms.

12. An exhibition device comprising a frame, a rotatable member supported thereon, fabric secured to one side of said rotatable member, a movable arm secured to said frame, and a brush secured to said arm and having its free end engaging the fabric of said rotatable member, and means for moving said arm.

EDWARD A. STORMAN.